July 2, 1957 C. S. LE CLAIR 2,797,936
APPARATUS FOR REFUELING IN FLIGHT
Filed Dec. 18, 1953 6 Sheets-Sheet 1

INVENTOR
Camille S. LeClair
BY Mason, Porter, Diller & Stewart
ATTORNEYS

July 2, 1957

C. S. LE CLAIR 2,797,936

APPARATUS FOR REFUELING IN FLIGHT

Filed Dec. 18, 1953

INVENTOR

Camille S. LeClair

BY Mason, Porter, Diller & Stewart

ATTORNEYS

July 2, 1957

C. S. LE CLAIR 2,797,936

APPARATUS FOR REFUELING IN FLIGHT

Filed Dec. 18, 1953

INVENTOR
Camille S. Le Clair
BY Mason, Porter, Diller & Stewart
ATTORNEYS

United States Patent Office 2,797,936
Patented July 2, 1957

2,797,936
APPARATUS FOR REFUELING IN FLIGHT

Camille S. Le Clair, Toronto, Ontario, Canada, assignor to The Parker Appliance Company, Cleveland, Ohio, a corporation of Ohio Application December 18, 1953, Serial No. 399,119

12 Claims. (Cl. 284—12)

The invention relates to new and useful improvements in a coupling for joining a hose leading from a tank plane to the conduit on the plane to be refueled. The coupling disclosed is in two sections. The section which is connected to the hose will hereinafter be referred to as the nozzle and the section connected to the plane to be refueled will be referred to as the fitting.

The nozzle has a valve which opens inwardly for controlling the flow of fuel therethrough. The fitting has a valve which opens outwardly for controlling the flow of fuel therethrough.

An object of the invention is to provide a nozzle with means whereby the fitting when moved into the nozzle first makes sealing contact therewith and then has a further movement for operating devices for simultaneously opening the valves of both the fitting and the nozzle.

A further object of the invention is to provide devices for locking the valve of the nozzle to the valve of the fitting so that an opening movement imparted to the nozzle valve will pull the fitting valve to open position.

A further object of the invention is to provide the nozzle with a slidable sleeve with which the fitting makes initial seating contact, said sleeve being movable with said fitting while the fitting is moved to finally seated position in the nozzle.

Another object of the invention is to provide devices operated by said sleeve for moving the valves to open position which devices are so constructed as to move the valves at a greater speed than the endwise movement of the sleeve.

Another object of the invention is to provide the nozzle valve with a latching means operated on the initial movement of the nozzle valve for locking the two valves together and operating when the valves are moved to near closed position to release the connection between valves.

Another object of the invention is to provide a yieldable means for securing the fitting to the nozzle with which is associated a locking means operated by the pressure on the fuel passing through the coupling for preventing the release of the fitting from the nozzle while fuel is still passing through the coupling.

These and other objects will in part be obvious and will in part be hereinafter more fully disclosed.

In the drawings which I have shown by way of illustration one embodiment of the invention.

The fitting includes a cylindrical body portion 1 which is adapted to be connected to a conduit leading to the tank of the plane being refueled. Extending in line with the body portion 1 of the fitting is an auxiliary body portion 2. This auxiliary portion of the body abuts against the body wall 1 and has inwardly extending webs 3 supporting a sleeve 4 in which is mounted a stem 5 of the valve 6 which closes the fitting. The sleeve 2 is secured to the body portion 1 by an outer sleeve 7 having a ledge 8 near its inner end which is adapted to engage the end of the sleeve 2 and clamp the opposite end of the sleeve against the end 8ª of the body portion 1 of the fitting. The outer sleeve is threaded as indicated at 9. A collar 10, freely movable on the body portion 1 is also threaded as indicated at 11. The end of the collar engages a ring 12 which is set into an annular groove in the outer face of the body portion 1. This collar 10 contacting the ring 12 when threaded into the outer sleeve 7 will pull the ledge 8 into contact with the inner sleeve 2 and the inner sleeve into contact with the end 8ª of the body portion 1. The valve 6 includes an inner part 13 which slides onto the valve stem or spindle and abuts against a collar 5ª thereon. The valve also includes an outer member 14 which is threaded onto the outer end portion of the valve stem. The member 14 of the valve engages the member 13 and holds the same up against the collar 5ª. The member 14 is turned onto the threaded end of the valve stem to a tight position, and for locking the two valve members in an assembled position a bolt 15 passing through an opening in the valve member 14 is engaged in one of the twelve tap holes in the valve member 13. The outer part at the center thereof has a neck extension 16 provided with a head 17. Surrounding the neck 16 is an annular space 18. A spring 19 surrounds the valve stem and bears at one end against the sleeve 4 and at its other end against the cap 20 which is secured to the valve stem. This cap is streamlined as indicated at 20ª so as to permit a free flow of fuel over the same. The spring is tensioned so as to normally hold the valve 6 closed. The valve 6 is provided with a ring gasket 21 which normally engages the end 22 of the outer sleeve 7.

The nozzle is made in two sections. The section which is connected to the hose of the tank plane is indicated at 23 and the section which receives the fitting is indicated at 24. These two sections are joined by what might be termed a ball joint. The section 23 is provided with a spherical section 25 and the section 24 has a similar shaped section, the outer face 26 of which makes contact with the inner face of the nozzle section 25. To facilitate the connecting of these sections the section 23 has an extension 27 which is bolted to a flange on the main section 23. The section 24 of the nozzle has an extension 28 carrying radial webs 29 which support a sleeve 30 in which there is telescopingly mounted a hollow stem 31 carrying a valve 32 which valve closes the nozzle when it is separated from the fitting. The valve 32 has an annular groove on the inner face thereof disposed close to the periphery of the valve. In this groove is set a gasket 33. The valve has a flange 34 which abuts against the flange 35 carried by the valve stem 31. These flanges are bolted together so that the valve 32 is rigidly supported by the valve stem 31.

The valve has an opening 36 therethrough and the extension 16 and head 17 carried thereby extend into this opening. The outer face 37 of the valve 6 may contact with the inner face 38 of the valve 32, and head 17 of said valve 6 abuts a bumper disk 17a in said valve 32.

Figure 1:
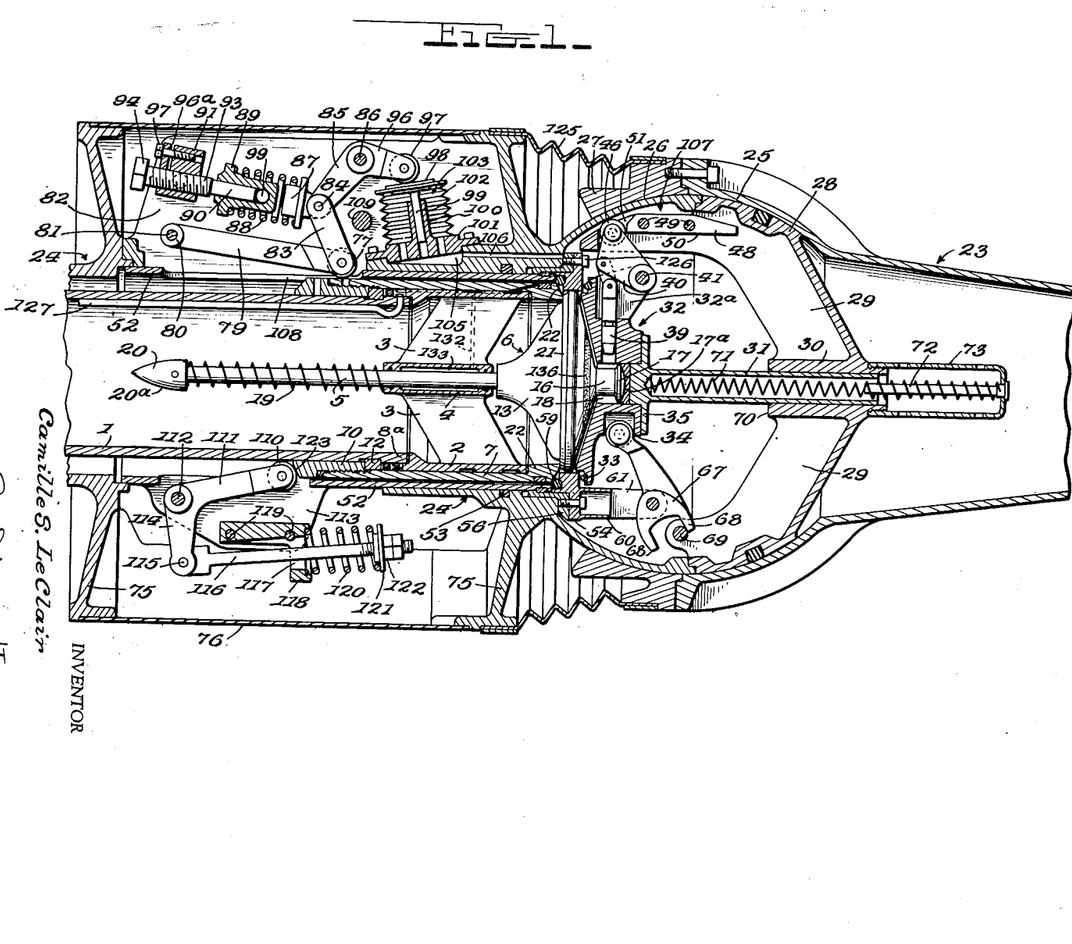
Figure 1 is a longitudinal sectional view through a nozzle with the fitting inserted therein to a sealing point with the nozzle and with the valves in closed position, the fitting valve being shown in elevation.
Figure 4:
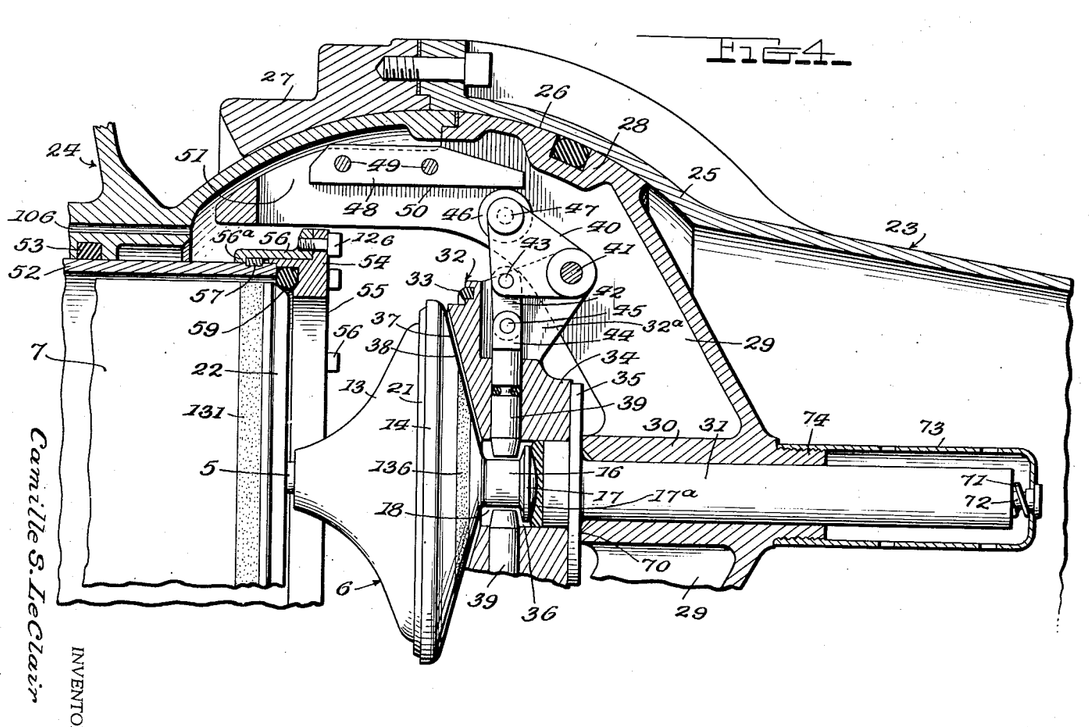
Figure 4 is a detail longitudinal section through a portion of the fitting and a portion of the nozzle showing the ….hing means for locking the nozzle valve to the fitting …ive, both valves being entirely open as in Figure 3.
Figure 5:
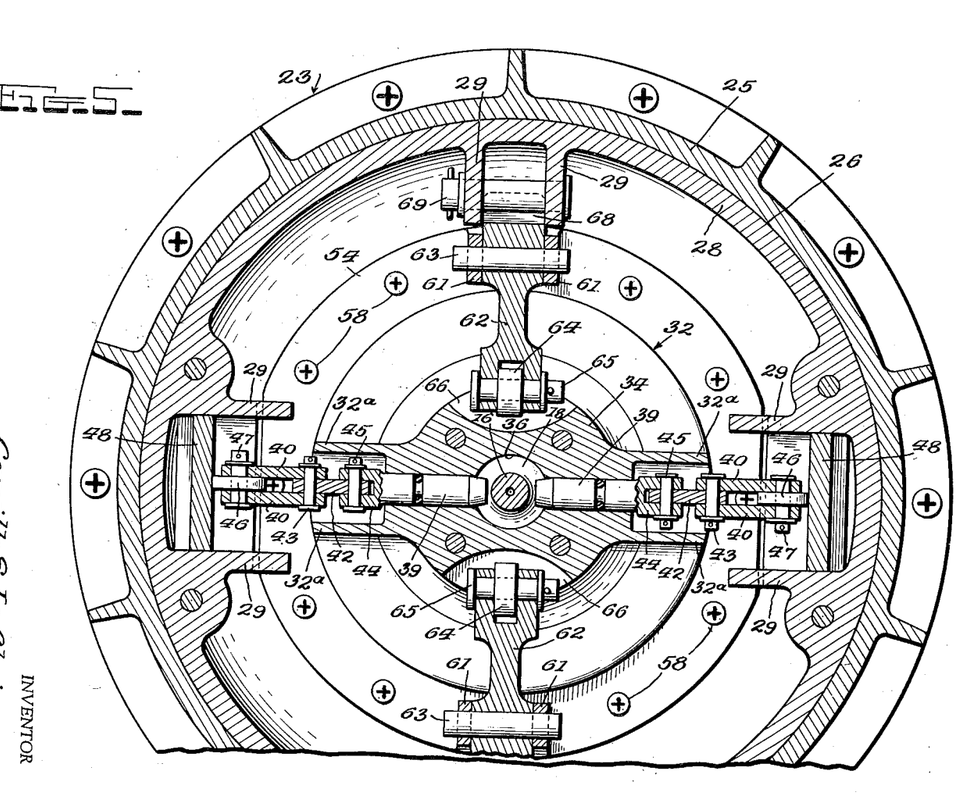
Figure 5 is a sectional view through a portion of the nozzle, said view being taken on the line 5, 5 of Figure 3.
Figure 6:
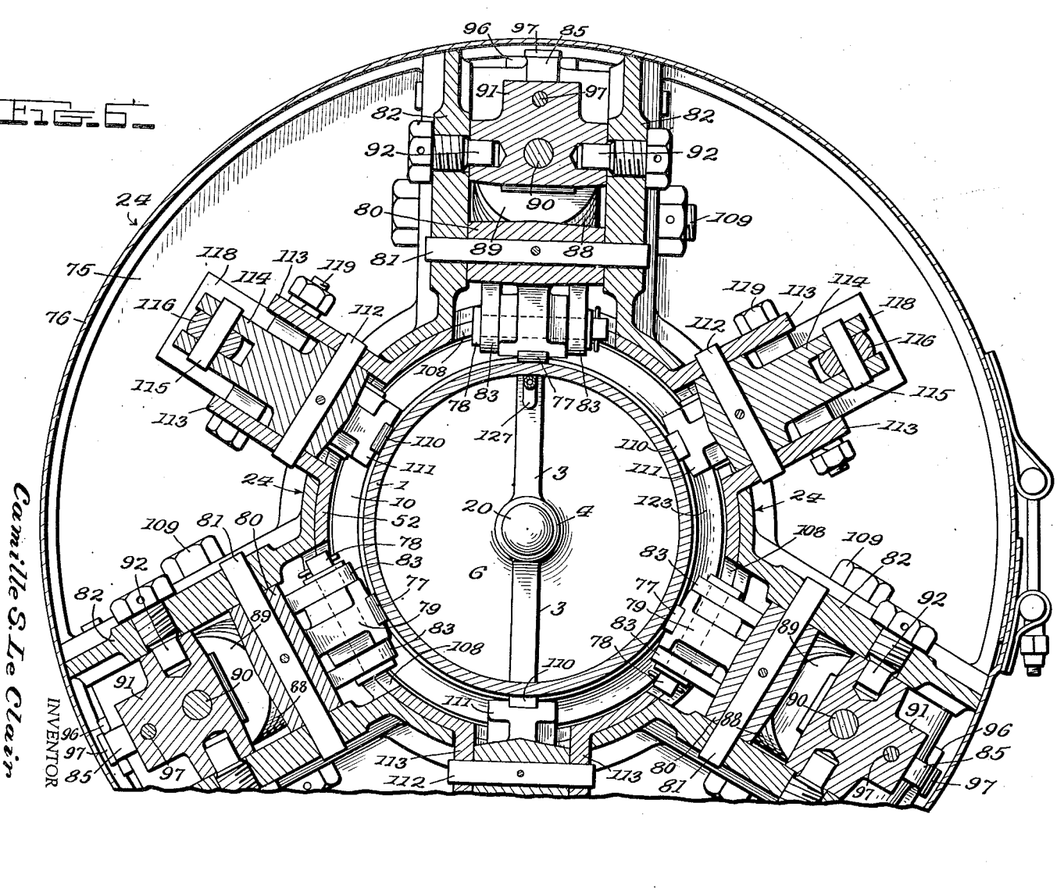
Figure 6 is a sectional view on the line 6, 6 of Figure 3.

Referring to Figures 4 and 5 there are two latching bolts 39, 39 mounted in the valve 32 for radial movement thereof. These latching bolts are adapted to be moved into the recess 18 in the neck portion of the valve 6 for the purpose of locking the two valves together so that any movement of one valve will be imparted to the other. There are two of these latching bolts arranged diametrically opposite from each other and the means for operating the same are the same, although independent of each other. Pivotally mounted on webs 32a of the valve 32 is a lever 40. This lever is pivoted to the webs at 41. The lever consists of two plates and extending between these two plates is a link 42 which is connected to the plates by a pin 43. At the outer end of the latch bolt 39 is a forked head 44 which receives the link and a pin 45 joins the link to the head. Located between the plates 40, 40 is a roller 46 mounted on a pin 47 which extends through the plates 40, 40. This roller 46 bears against a cam plate 48, which is secured to an extension of the web 29 by suitable bolts 49, 49. As long as the roller 46 is on the face 50 of the cam 48 the latching bolts will be held in locking engagement with the valve 6. When the roller, however, moves to the left-hand end of this cam plate 48 it will move off from the face 50 and into the space 51. This occurs when the valves are in closed position and if the valve moves from the position shown in Figure 4 to closed position then the roller dropping into the space will retract the latching bolts. Referring to Figure 1, the valves are shown in closed position and the roller is shown in this space 51 and the latching bolts withdrawn.

Figure 2:
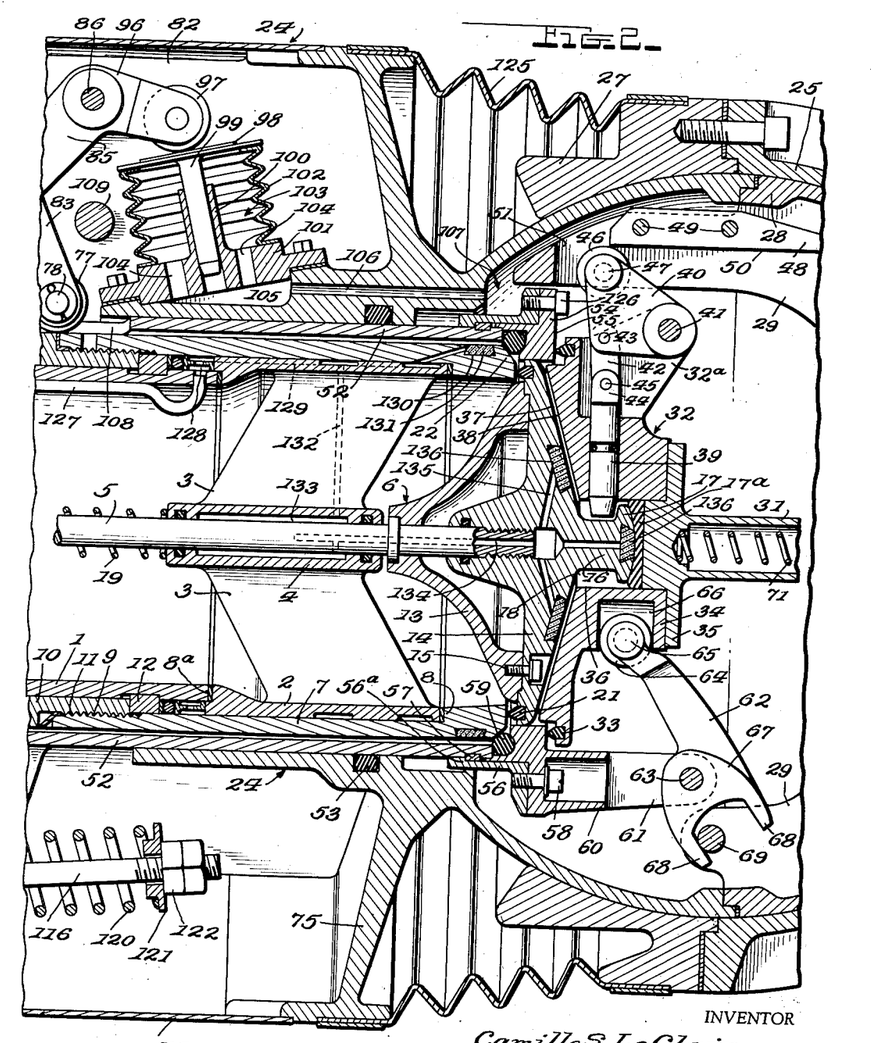
Figure 2 is an enlarged fragmentary view similar to a portion of Figure 1 but showing the fitting as having moved into the nozzle sufficiently for locking the nozzle valve to the fitting valve, both valves being shown in section in this view.

In Figure 2, the valves are shown still in closed position but having moved as a unit so that the roller 46 has moved out of the space 51 onto the face 50 of the cam 48 and this has caused the latching bolts to move radially and lock the two valves together. Mounted in the section 24 of the nozzle is a sleeve 52. This sleeve 52 has a limited endwise movement in the nozzle section 24. There is a sealed connection 53 between the sleeve and the inner wall of the section 24. At the outer end of the sleeve 52 is a ring 54 which has a valve seat 55 on its inner face with which the gasket 33 makes contact. This ring 54 is connected to the sleeve 52 by a member 56 having a shoulder 56a contacting a hardened steel ring 57 fitted into an annular groove in the outer face of the sleeve 52. There are bolts 58 which clamp this member 56 to the ring 54. Inbetween the ring 54 and the end of the outer sleeve is clamped a ring gasket 59. When the fitting moves into the sleeve 52 it will first contact with the gasket 59. This makes a sealed tight connection between the fitting and the sleeve 52 of the nozzle. While the sleeve 52 has a sliding movement in the section 24 of the nozzle it is a fluid tight sealed connection by reason of the gasket 53.

The ring 54 attached to the inner end of the sleeve 52 has an extension 60. There are two of these extensions at diametrically opposite sides. The extension is tubular and the inner end portion is slotted providing spaced members 61, 61 (see Fig. 5). Disposed between these members is a lever 62 which is pivotally connected to the members 61 by a pivot pin 63. The outer end of the lever is forked and between the forked ends is a roller 64 mounted for rotation on a pivot pin 65. This roller engages in a recess 66 provided in the valve 32. At its outer end the lever carries a forked member 67. The forked ends 68, 68 are adapted to cooperate with a pin 69 attached to an extension of the web 29. This distance between the forked ends 68 is larger than the diameter of the pin 69.

Figure 3:
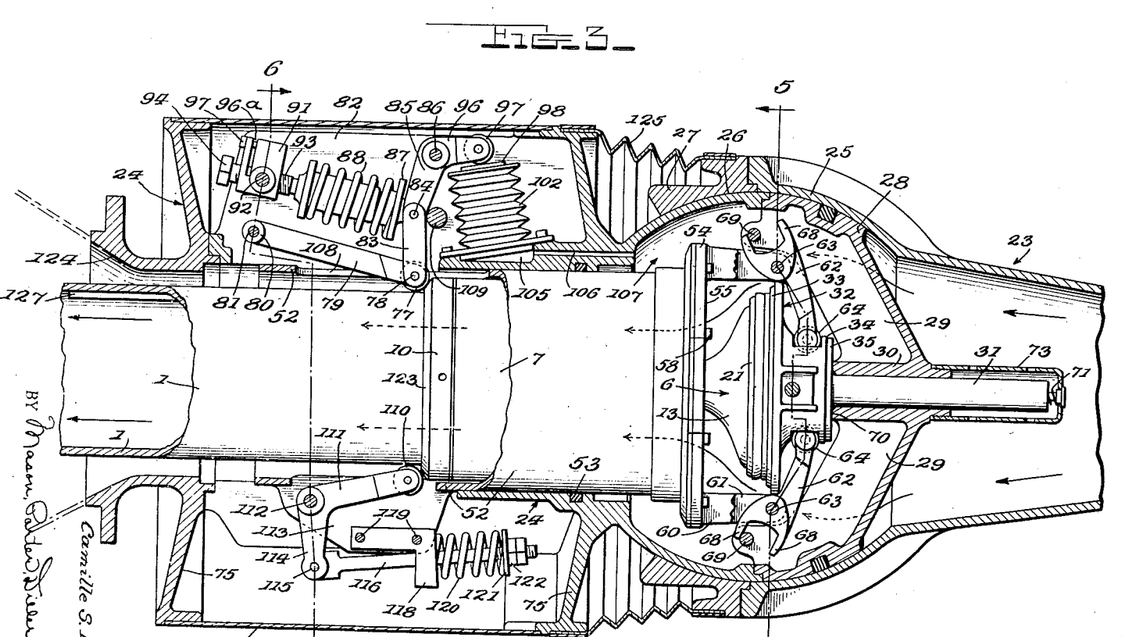
Figure 3 is a view similar to Figure 1 but showing the fitting in its final position in the nozzle and with the valves fully opened, portions of the fitting and nozzle being shown in elevation.

When the fitting has entered the nozzle the end 22 of the outer sleeve of the fitting will first make sealing contact with the gasket 59 carried by the sleeve 52 of the nozzle. This is the position of the parts as shown in Fig. 1. The fitting continues its inward movement and will move the sleeve a short distance and this will bodily shift the lever 62 so that the pin 69 will move from contact with one fork end 68 to the other as shown in Figure 2. This short movement of the two valves while still in closed position is for the purpose of locking the nozzle valve to the fitting valve. The roller 46 moves out of the space 51 onto the face of the cam 48 and this moves the latch pins 39 inwardly locking the two valves together. Further movement of the sleeve by the fitting will cause the levers 62 not only to move bodily but to swing on their pivotal connection 63. This oscillation of the lever will impart a very much speedier movement to the opening of the valves than the movement of the slide 52. The valve 32 of the nozzle will be moved to full open position which is limited by the contact of the flange 35 of the valve with a stop shoulder 70 on the sleeve 30 in which the stem of the valve slides. Both the valves will be open to the full extent as shown in Figure 3 and the fitting will have reached its final seated position in the nozzle. Located in the hollow stem 31 of the valve 32 is a compression spring 71. As the valve is moved to open position the spring will be compressed and will aid in seating the valve and holding it seated when the valve is closed.

A pin 72 carried by a cap 73 extends centrally through the spring and guides the same when the valve is moved to closed position. This cap 73 has a threaded engagement with an extension 74 on the web 29.

The body section 24 of the nozzle has outwardly projecting flanges 75, 75 and a covering case 76 extends between these flanges. Located in the space between the casing and the body portion of the section 24 is a latching device for holding the fitting in its seated position in the nozzle. There are three of these latching devices disposed at 120 degrees apart. Each latching device includes a roller 77 mounted on a pivot pin 78 carried in a forked end of an arm 79 formed integral with a hub member 80 carried by a pivot rod 81 mounted in webs 82, 82 carried by the section 24 of the nozzle.

Mounted on the pivot pin 78 and extending upwardly therefrom are two links 83, 83. These links at their upward end are connected to a pivot pin 84 carried at the lower end of a lever arm 85, said lever arm being pivoted at 86 to the webs 82.

Mounted on the pivot pin 84 is an abutment head 87. A compression spring 88 bears against the head 87. The spring at its other end bears against a sleeve 89 mounted on a rod 90 which extends through a cross head 91 mounted on pivot studs 92, 92 which in turn are carried by the spaced webs 82, 82. The rod 90 is threaded into the cross head as indicated at 93 and carries a head 94 whereby the rod may be adjusted in the cross head. The inner end of the rod 90 bears against a ball 95 at the inner end of a socket in the sleeve 89. The cross head is split as indicated at 96a and the threaded bolt 97 provides a means for drawing the sections of the cross head into closer relation for gripping and holding the threaded rod in a set position.

The lever arm 85 carries a second arm 96. This second arm is provided with a roller 97 which bears against the end of a plate 98 carried by a stem 99 which reciprocates in a sleeve 100 carried by a bracket head 101 secured to the section 24 of the nozzle. There is a bellows 102 which connects the plate 98 with the bracket and forms a chamber 103. There are ports 104 connecting the chamber 103 to an auxiliary chamber 105 and there are ports 106 which connect this auxiliary chamber with the main chamber 107 in the nozzle through which the fluid passes. Through these ports fluid when passing through the coupling may pass to the chamber 103 and cause the bellows to be expanded. When the coupling members move into initial engagement as shown in Figure 1 the roller 77 of this latching mechanism will engage the outer sleeve 7 of the fitting. At this time the spring 88 is compressed to a greater extent than initially. Inasmuch as there is no fluid passing through the coupling the bellows chamber 103 is free from pressure and the link 83 and lever arm 85 are in the position of a broken toggle. As the fitting moves into the nozzle the roller 77 will move along this outer sleeve 10 and finally pass through the slot 108. As the fitting goes on to its final seated position the roller 77 will drop behind the end of the sleeve 10 as shown in Figure 3. The valves are now open and fluid enters the bellows 103 and forces the roller 97 outwardly and this brings the links 83 and the lever arm 85 into substantial alignment and in contact with a stop bar 109 carried by the webs 82. The spring forces the links 83 into engagement with the stop 109 and the roller 97 operating upon the lever 85 locks the roller 77 in its engagement with the end of the outer sleeve 10 of the fitting.

There is another latching means carried by the nozzle for holding the sleeve 52 in an extended position. There are three of these latching devices arranged intermediate the latching devices described above. These latching devices for holding the sleeve in extended position include a roller 110 mounted on an elbow lever 111 pivoted at 112 to a web 113 formed as a part of the sleeve 52. The other arm 114 of the elbow lever is pivoted at 115 to a rod 116 passing through an opening 117 in a bracket 118 secured by bolts 119 to the web 113. A spring 120 engages a seat in the outer face of the bracket 118 at its inner end and it engages a washer 121 mounted on the rod 116 at its outer end. A nut 122 threaded onto the end of the rod 116 serves as a means for shifting the washer 121 and varying the tension on the spring. The sleeve 52 is slotted and the roller 110 may pass through said slot. The spring 120 constantly urges the elbow lever to swing on its pivot 112 in a counter-clockwise direction. When the fitting moves into the nozzle to its initial sealing position as shown in Figure 1 the roller 110 will drop behind the end 123 of the inner sleeve 7 of the fitting. The sleeve 52 of the nozzle and the fitting move together from this point on until the valves are fully opened.

In the coupling of the parts preparatory to refueling the fitting may move into the nozzle, or the nozzle may move onto the fitting. It is a relative movement of these parts that brings the sections of the coupling together. For the sake of clearness, the fitting will be referred to as moving into the nozzle. The nozzle has a tapered entrance end 124. As the fitting moves into the nozzle it may be centered relative to the entrance opening in the nozzle or it may contact this tapered surface. The purpose of the ball joint between the sections 23 and 24 of the nozzle is to allow the section 24 to shift slightly to aid in the lining up of the fitting and nozzle for the entrance of the fitting. There is a bellows 125 that is connected at one end to the web 75 and at its other end to the collar 27 which is a part of the section 23. This permits the movement of the section 24 relative to the section 23 and protects the joint against accumulation of dirt and dust thereon. As the fitting enters the nozzle it passes into the sleeve 52 and finally engages the gasket 59. This is the initial position of the fitting in the nozzle. This is a sealed engagement and at this time the valve 6 of the fitting is in full closed position as shown in Figure 1. The forwardly projecting neck end of the valve 6 at this time has moved into the passage 18 in the valve 32 of the nozzle. The valve 6 is also moved into contact with the valve 32. A further movement of the fitting will move the valve 32 a short distance and this will carry the roller 46 out of the recess 51 onto the face 50 of the cam 48. This movement of the roller 46 will force the latching bolts into engagement with the annular recess in the neck of the fitting valve and lock the two valves together. Further movement of the fitting will carry along with it the sleeve 52 of the nozzle and this will bring the forked end of the levers 62 into engagement with the pin 69. Still further movement of the fitting will not only move the lever 62 bodily but it will swing it on its pivot and cause the valves to move to full open position. When the valves have reached this full open position they engage a stop 70 and can move no further. The fitting is now fully seated in the nozzle and as noted the valves are wide open. At this time the roller 77 will drop off from the sleeve 10 of the fitting into engagement with the end 123 thereof. The spring 88 moves the links 83 and the lever arm 85 into engagement with the stop 109. The fuel passing through the upper parts will pass through the passage 106 to the bellows 102, thus applying a force to the roller 97 which will hold the roller 77 in its latched position.

After a refueling operation, the coupling parts are disconnected in the following manner. First the fuel supply is shut off. This will remove the pressure on the bellows 102 so that the toggle position of the link 83 and the lever arm 85 are under the sole control of the compression spring 88. There must be a sufficient pull tending to separate the parts which will cause this compression spring 88 to yield and permit the roller 77 to move up onto the outer face of section 10 of the outer sleeve 7 of the fitting. The roller 110 still remains in its abutted relation to this outer sleeve section 10. Further withdrawal movement of the fitting will move the sleeve 52 and this retracting movement of the sleeve 52 will cause the levers 62 to move the valves towards closed position. As they approach the closed position the roller 46 will move off the face 50 of the cam 48 into the space 51 and this will retract the latch bolts 39 and disconnect the valves so that they may be separated as the fitting continues its further retracting movement. The ring member 54 of the sleeve 52 carries stop bolts 126 which limit further outward movement of the sleeve 52 and the extension carried thereby. The pull on the fitting will now cause the roller 110 to move outward and release the fitting so that it may be completely withdrawn from the nozzle. The valve 6 is held by the spring 19 in tight sealing contact with the end of the fitting. This outwardly opening valve has a number of advantages. The atmospheric pressure against the valve tends to close it tighter. The outwardly opening valve also eliminates pockets which are acceptable to ice formation. The frontal area of the fitting may be reduced to a minimum without exceeding a specified fluid pressure drop.

One of the advantages of this type of coupling is the ease with which a de-icing fluid may be delivered to the regions where ice is likely to accumulate. The de-icing fluid is directed to a pipe 127 disposed along the wall at the inside of the fitting. This pipe is connected to an annular passage 128 and from the annular passage 128 along the port 129 to another annular passage 130 in which is disposed a pad 131 for disseminating the de-icing fluid. There is also a radial passage 132 in one of the webs 3 which leads to a passage 133 in the sleeve 4 and from this passage 133 through a central passage 134 in the steam of the valve to ports 135, 135 to pads 136. These pads serve to disseminate the de-icing fluid and prevent accumulation of ice on the valve. When the valve 32 of the nozzle reaches closed position then the gasket 33 contacts the seat 55 and the compression spring 71 will hold the valve tightly closed.

It is obvious that many changes may be made in the details of construction without departing from the spirit of the invention as set forth in the appended claims.

I claim:

1. An apparatus for refueling in flight comprising a nozzle having a fuel supply conduit, a valve in said nozzle for closing the conduit, a sleeve disposed in said nozzle and having a limited sliding movement therein, a fitting having a conduit for receiving the fuel, an outwardly opening valve in said fitting for closing the conduit in said fitting, means effective upon movement of the fitting into the nozzle for establishing a sealed contact between the fitting and said sleeve, and means carried by said fitting for moving said sleeve to the limit of its movement in the nozzle, meals in the nozzle operated by the initial movement of the sleeve for locking the two valves one to the other for movement together, and means in the nozzle operated by further movement of the sleeve for subsequently opening both of said valves to permit passage of fuel from the fuel supply conduit into the fuel receiving conduit.

2. An apparatus for refueling in flight comprising a nozzle having a fuel supply conduit, a valve in said nozzle for closing the conduit, a sleeve disposed in said nozzle and having a limited sliding movement therein, a fitting having a conduit for receiving the fuel, an outwardly opening valve in said fitting for closing the conduit in said fitting, means effective upon movement of the fitting into the nozzle for establishing a sealed contact between the fitting and said sleeve, means carried by said fitting for moving said sleeve to the limit of its movements in the nozzle, latching bolts carried by said nozzle valve and adapted to engage said fitting valve for locking the two valves together, and means operable during the initial movement of the sleeve for moving the bolts to locking position.

3. An apparatus for refueling in flight comprising a nozzle having a fuel supply conduit, a valve in said nozzle for closing the conduit, a sleeve disposed in said nozzle and having a limited sliding movement therein, a fitting having a conduit for receiving the fuel, an outwardly opening valve in said fitting for closing the conduit in said fitting, means effective upon movement of the fitting into the nozzle for establishing a sealed contact between the fitting and said sleeve, means carried by said fitting for moving said sleeve to the limit of its movement in the nozzle, latching bolts carried by said nozzle valve adapted to engage said fitting valve for locking the two valves together, and means operable during the initial movement of the sleeve for moving the bolts to locking position, and means operated by said sleeve for moving said valves to open position to permit passage of fuel from the fuel supply conduit into the fuel receiving conduit.

4. An apparatus for refueling in flight comprising a nozzle having a fuel supply conduit, a valve in said nozzle for closing the conduit, a sleeve disposed in said nozzle and having a limited sliding movement therein, a fitting having a conduit for receiving the fuel, an outwardly opening valve in said fitting for closing the conduit in said fitting, means effective upon movement of the fitting into the nozzle for establishing a sealed contact between the fitting and said sleeve, means carried by said fitting for moving said sleeve to the limit of its movement in the nozzle, latching bolts carried by said nozzle valve adapted to engage said fitting valve for locking the two valves together, means operable during the initial movement of the sleeve for moving the bolts to locking position, and devices operated by said sleeve for moving the valves when locked together to open position, said devices including a lost motion couple to operate said devices to open said valves after said valves have been locked together.

5. An apparatus for refueling in flight comprising a nozzle having a fuel supply conduit, a valve in said nozzle for closing the conduit, a sleeve disposed in said nozzle and having a limited sliding movement therein, a fitting having a conduit for receiving the fuel, an outwardly opening valve in said fitting for closing the conduit in said fitting, means effective upon movement of the fitting into the nozzle for establishing a sealed contact between the fitting and said sleeve, means carried by said fitting for moving said sleeve to the limit of its movement in the nozzle, latching bolts carried by said nozzle valve adapted to engage said fitting valve for locking the two valves together, means operable during the initial movement of the sleeve for moving the bolts to locking position, and devices operated by said sleeve for moving the valves when locked together to open position, said devices including levers bodily movable with the sleeve and pivoted intermediate their ends on said sleeve, the inner end of each lever carrying a roller engaging an annular recess in said nozzle valve, post means fixed to the nozzle and engageable by the other end of each lever during bodily movement of the levers with the sleeve and effective to cause the levers to oscillate and bring about an opening of said valves.

6. An apparatus for refueling in flight comprising a nozzle having a fuel supply conduit, a valve in said nozzle for closing the conduit, a sleeve disposed in said nozzle and having a limited sliding movement therein, a fitting having a conduit for receiving the fuel, an outwardly opening valve in said fitting for closing the conduit in said fitting, means effective upon movement of the fitting into the nozzle for establishing a sealed contact between the fitting and said sleeve, means carried by said fitting for moving said sleeve to the limit of its movement in the nozzle, latching bolts carried by said nozzle valve adapted to engage said fitting valve for locking the two valves together, means operable during the initial movement of the sleeve for moving the bolts to locking position, and devices operated by said sleeve for moving the valves when locked together to open position, said devices including levers bodily movable with the sleeve and pivoted intermediate their ends on said sleeve, the inner end of each lever carrying a roller engaging an annular recess in said nozzle valve, post means fixed to the nozzle and engageable by the other end of each lever during bodily movement of the levers with the sleeve and effective to cause the levers to oscillate and bring about an opening of said valves, said levers at said other ends having a lost motion contact with said post means so that the initial movement of the sleeve will bring about a locking of the valve together and further movement of the sleeve will oscillate the levers to open the valves.

7. An apparatus for refueling in flight comprising a nozzle having a fuel supply conduit, a valve in said nozzle for closing the conduit, a sleeve disposed in said nozzle and having a limited sliding movement therein, a fitting having a conduit for receiving the fuel, an outwardly opening valve in said fitting for closing the conduit in said fitting, means effective upon movement of the fitting into the nozzle establishing a sealed contact between the fitting and said sleeve, and means carried by said fitting for moving said sleeve to the limit of its movement in the nozzle, means in the nozzle operated by the initial movement of the sleeve for locking the two valves one to the other for movement together, means in the nozzle operated by further movement of the sleeve for subsequently opening both of said valves, and a latching means for securing fitting and the nozzle together when the valves have moved to full open position, said latching means including devices operable by pressure of the fluid passing through the conduits when the valves are open for securing the effective condition of the latching means.

8. An apparatus for refueling in flight comprising a nozzle having a fuel supply conduit, a valve in said nozzle for closing the conduit, a sleeve disposed in said nozzle and having a limited sliding movement therein, a fitting having a conduit for receiving the fuel, an outwardly opening valve in said fitting for closing the conduit in said fitting, means effective upon movement of the fitting into the nozzle for establishing a sealed contact between the fitting and said sleeve, means carried by said fitting for moving said sleeve to the limit of its movement in the nozzle, means in the nozzle operated by the initial movement of the sleeve for locking the two valves one to the other for movement together, means in the nozzle operated by further movement of the sleeve for subsequently opening both of said valves, and a latching means for securing the fitting and the nozzle together when the valves have moved to full open position, said latching means including a roller, an arm carrying said roller, toggle links connected to said arm, a lever arm connected to said toggle links and an abutment head mounted on the connection between the link and the lever arm, a compression spring adapted to engage said abutment head, a supporting bracket, a rod carried thereby and having an abutment collar engaged by said compression spring, said spring operating to move the roller into holding engagement with the fitting.

9. An apparatus for refueling in flight comprising a nozzle having a fuel supply conduit, a valve in said nozzle for closing the conduit, a sleeve disposed in said nozzle and having a limiting sliding movement therein, a fitting having a conduit for receiving the fuel, an outwardly opening valve in said fitting for closing the conduit in said fitting, means effective upon movement of the fitting into the nozzle for establishing a sealed contact between the fitting and said sleeve, means carried by said fitting for moving said sleeve to the limit of its movement in the nozzle, means in the nozzle operated by the initial movement of the sleeve for locking the two valves one to the other for movement together, means in the nozzle operated by further movement of the sleeve for subsequently opening both of said valves, and a latching means for securing the fitting and the nozzle together when the valves have moved to full open position, said latching means including a roller, an arm carrying said roller, toggle links connected to said arm, a lever arm connected to said toggle links and an abutment head mounted on the connection between the link and the lever arm, a compression spring adapted to engage said abutment head, a supporting bracket, a rod carried thereby and having an abutment collar engaged by said compression spring, said spring operating to move the roller into holding engagement with the fitting, said latching means including devices operable by pressure of the fluid passing through the conduits, when the valves are open for securing the effective condition of the latching means.

10. An apparatus for refueling in flight comprising a nozzle having a fuel supply conduit, a valve in said nozzle for closing the conduit, a sleeve disposed in said nozzle and having a limiting sliding movement therein, a fitting having a conduit for receiving the fuel, an outwardly opening valve in said fitting for closing the conduit in said fitting, means effective upon movement of the fitting into the nozzle for establishing a sealed contact between the fitting and said sleeve, means carried by said fitting for moving said sleeve to the limit of its movement in the nozzle, means in the nozzle operated by the initial movement of the sleeve for locking the two valves one to the other for movement together, means in the nozzle operated by further movement of the sleeve for subsequently opening both of said valves, and a latching means for securing the receptive fitting and the nozzle together when the valves have moved to full open position, said latching means including a roller, an arm carrying said roller, toggle links connected to said arm, a lever arm connected to said toggle links and an abutment head mounted on the connection between the link and the lever arm, a compression spring adapted to engage said abutment head, a supporting bracket, a rod carried thereby and having an abutment collar engaged by said compression spring, said spring operating to move the roller into holding engagement with the fitting, an arm extension formed rigidly with said lever arm, a roller carried by said arm extension, a bellows having an end plate closing the same, ports connecting the chamber within the bellows with the fuel conduit so that pressure on the fuel will expand the bellows and cause the plate thereon to contact the extension carried roller and lock the holding roller in engagement with the fitting.

11. An apparatus for refueling in flight comprising a nozzle having a fuel supply conduit, a valve in said nozzle for closing the conduit, a sleeve disposed in said nozzle and having a limited sliding movement therein, a fitting having a conduit for receiving the fuel, an outwardly opening valve in said fitting for closing the conduit in said fitting means effective upon movement of the fitting into the nozzle for establishing a sealed contact between the fitting and said sleeve, means carried by said fitting for moving said sleeve to the limit of its movement in the nozzle, means operated by said sleeve for locking the two valves one to the other for movement together, means operated by the sleeve for subsequently opening both of said valves, and a yielding latching means carried by the nozzle adapted to engage the fitting for holding the fitting from withdrawing from the sleeve until the valves are closed.

12. An apparatus for refueling in flight comprising a nozzle having a fuel supply conduit, a valve in said nozzle for closing the conduit, a sleeve disposed in said nozzle and having a limited sliding movement therein, a fitting having a conduit for receiving the fuel, an outwardly opening valve in said fitting for closing the conduit in said fitting, means effective upon movement of the fitting into the nozzle for establishing a sealed contact between the fitting and said sleeve, means carried by said fitting for moving said sleeve to the limit of its movement in the nozzle, means operated by said sleeve for locking the two valves one to the other for movement together, means operated by the sleeve for subsequently opening both of said valves, means operating on said nozzle valve for moving the two valves to closed position and for bringing about a releasing of the locked together condition of the two valves, and a yieldable latching means carried by said nozzle and adapted to engage said fitting for holding the fitting from withdrawing from the sleeve until the valves are closed.

References Cited in the file of this patent

UNITED STATES PATENTS

| | | |
|---|---|---|
| 2,199,588 | Cobham et al. | May 7, 1940 |
| 2,634,926 | Worlidge | Apr. 14, 1953 |
| 2,634,927 | Smith | Apr. 14, 1953 |
| 2,665,926 | Fraser | Jan. 12, 1954 |
| 2,692,102 | Cobham et al. | Oct. 19, 1954 |

FOREIGN PATENTS

| | | |
|---|---|---|
| 657,730 | Great Britain | Sept. 26, 1951 |
| 865,201 | France | Feb. 17, 1941 |